United States Patent
Lehmann et al.

(10) Patent No.: US 11,707,894 B2
(45) Date of Patent: Jul. 25, 2023

(54) ANCHORING OF CONNECTOR ELEMENT

(71) Applicant: WoodWelding AG, Stansstad (CH)

(72) Inventors: Mario Lehmann, Les Pommerats (CH); Laurent Torriani, Lamboing (CH); Muthumariappan Sankaran, Älmhult (SE); Joakim Kvist, Nidau (CH)

(73) Assignee: WOODWELDING AG, Stansstad (CH)

( * ) Notice: Subject to any disclaimer, the term of this patent is extended or adjusted under 35 U.S.C. 154(b) by 0 days.

(21) Appl. No.: 17/259,398

(22) PCT Filed: Jul. 12, 2019

(86) PCT No.: PCT/EP2019/068868
§ 371 (c)(1),
(2) Date: Jan. 11, 2021

(87) PCT Pub. No.: WO2020/012000
PCT Pub. Date: Jan. 16, 2020

(65) Prior Publication Data
US 2021/0122121 A1    Apr. 29, 2021

(30) Foreign Application Priority Data
Jul. 13, 2018 (CH) .................................. 00871/18

(51) Int. Cl.
*F16B 13/08* (2006.01)
*B29C 65/08* (2006.01)
(Continued)

(52) U.S. Cl.
CPC ............ *B29C 65/08* (2013.01); *B29C 65/603* (2013.01); *B29C 66/8322* (2013.01);
(Continued)

(58) Field of Classification Search
CPC ........... F16B 13/0841; F16B 2013/009; B29C 66/302; B29C 66/303; B29C 65/603
See application file for complete search history.

(56) References Cited

U.S. PATENT DOCUMENTS 3,444,018 A * 5/1969 Hewitt ............... B29K 2027/18
156/73.5
8,403,938 B2 * 3/2013 Aeschlimann ..... A61B 17/7233
606/93

(Continued)

FOREIGN PATENT DOCUMENTS

CN      105074234    11/2015
WO      2009/052644   4/2009
(Continued)

OTHER PUBLICATIONS

English translation of Chinese Office Action dated Mar. 18, 2022, Application No. 201980046403.0, 9 pages.

*Primary Examiner* — Scott W Dodds
(74) *Attorney, Agent, or Firm* — Rankin, Hill & Clark LLP

(57) ABSTRACT

A method of anchoring a lightweight building element having a first building layer and an interlining layer distally of the first building layer, and possibly a second building layer distally of the interlining layer. For anchoring, the distal end of a connector element is inserted into a mounting hole in the lightweight building element, and also a sleeve including a thermoplastic material is inserted into the mounting hole, the sleeve enclosing the connector element. Then, a distally facing liquefaction face of the sleeve is caused to be in contact with a proximally facing support face of the connector element. Energy impinges to liquefy at least a flow portion of the thermoplastic material of the sleeve, and the liquefaction face is pressed against the support face to cause at least a fraction of the flow portion to flow radially (Continued)

outward. After the flow portion has re-solidified, it anchors the connector element in the receiving object.

19 Claims, 7 Drawing Sheets

(51) Int. Cl.
    *B29C 65/00*     (2006.01)
    *B29C 65/60*     (2006.01)
    *B29K 101/12*     (2006.01)
    *F16B 5/01*     (2006.01)
    *F16B 13/14*     (2006.01)

(52) U.S. Cl.
    CPC ........ *F16B 13/0841* (2013.01); *B29C 66/474* (2013.01); *B29C 66/727* (2013.01); *B29C 66/72325* (2013.01); *B29C 66/7392* (2013.01); *B29K 2101/12* (2013.01); *F16B 5/01* (2013.01); *F16B 13/141* (2013.01)

(56) References Cited

U.S. PATENT DOCUMENTS

| | | | | |
|---|---|---|---|---|
| 2011/0062617 | A1* | 3/2011 | Lehmann | B29C 66/8227 425/432 |
| 2014/0044476 | A1* | 2/2014 | Cove | B29C 66/8322 403/270 |
| 2015/0174818 | A1* | 6/2015 | Mayer | B29C 66/723 156/73.1 |
| 2017/0334147 | A1* | 11/2017 | Mayer | B29C 66/7392 |
| 2018/0094660 | A1* | 4/2018 | Mayer | F16B 19/086 |

FOREIGN PATENT DOCUMENTS

| | | |
|---|---|---|
| WO | 2010/072009 | 7/2010 |
| WO | 2016/198546 | 12/2016 |
| WO | 2016/198547 | 12/2016 |
| WO | 2017/162693 | 9/2017 |

* cited by examiner

ANCHORING OF CONNECTOR ELEMENT

The subject matter claimed in this application was made as a result of activities undertaken within the scope of a joint research agreement (license agreement) dated Nov. 8/9, 2011 between WW Woodwelding GmbH, Stansstaad and IKEA Supply AG, Pratteln, Switzerland. Pursuant to the joint research agreement, all rights and obligations of WW Woodwelding GmbH are vested in its parent corporation, Woodwelding SA, Stansstaad, Switzerland.

BACKGROUND OF THE INVENTION

Field of the Invention

The present invention is in the fields of mechanical engineering and construction, especially mechanical construction, for example automotive engineering, caravan construction, aircraft construction, building of railroad wagons and locomotives, shipbuilding, machine construction, furniture construction, toy construction etc. The invention more particularly relates to a method of anchoring a connector element in a receiving object. The invention also relates to a machine for carrying out the method, and to a connector element anchoring kit.

Description of Related Art

In the automotive, aviation and other industries, there has been a tendency to move away from steel-only constructions and to use lightweight material instead.

An example of new building material elements are lightweight building elements that include two outer, comparably thin building layers, for example of a fiber composite, such as a glass fiber composite or carbon fiber composite, a sheet metal or also, depending on the industry, of a fiberboard, and a middle layer (interlining) arranged between the building layers, for example a honeycomb structure of cardboard or other material, or a lightweight metallic foam or a polymer foam or ceramic foam, etc., or a structure of discrete distance holders. Lightweight building elements of this kind may be referred to as "sandwich boards" and are sometimes called "hollow core boards (HCB)". They are mechanically stable, may look pleasant and have a comparably low weight.

Also other building elements that are comparably lightweight, like the interlining layer of the mentioned sandwich boards, include building layers that have a comparably low density by having gas-filled cavities, such as for example foam materials.

The new materials cause new challenges in bonding elements of these materials—for example in bonding a flattish object to another object or in anchoring a connector element in a lightweight material piece.

Further, according to the state of the art, reinforcements in sandwich board constructions have to be provided during their manufacture, and also connecting elements have to be added during manufacturing. If they are subsequently added, the sandwich core has to be foam-filled subsequently to fastening the connector, which is costly and time consuming.

To meet these challenges and to eliminate possible disadvantages, the automotive, aviation and other industries have started heavily using adhesive bonds. Adhesive bonds can be light and strong but suffer from the disadvantage that there is no possibility to long-term control the reliability, since a degrading adhesive bond, for example due to an embrittling adhesive, is almost impossible to detect without entirely releasing the bond. Also, adhesive bonds may lead to a rise in manufacturing cost, both, because of material cost and because of delays caused in manufacturing processes due to slow hardening processes, especially if the surfaces to be connected to each other have certain roughness and as a consequence the quickly hardening thin-layer adhesives cannot be used. Also, the strength of adhesive bonds depends on the strengths of the outermost layers of the elements to be connected.

WO 2016/198 547, WO 2017/162693, and WO 2018/015527 all disclose approaches for anchoring a connector in a lightweight building element by means of thermoplastic material that is liquefied and, after re-solidification. A possible limitation of these approaches is that the anchoring strength may depend on the mechanical strength of the middle layer (interlining layer) at the place where the connector penetrates into it. However, there may be situations in which the interlining needs to be removed at this spot, for example for the connector to be anchored at a well-defined position and depth.

WO 2010/072009 discloses a method of anchoring a connector in a lightweight building element with a first and second building layer, wherein the connector has a sleeve element and a piston element, and the method includes coupling mechanical oscillations into the piston element to liquefy thermoplastic material of the sleeve element and/or of the piston element at an interface and to cause liquefied thermoplastic material to flow into structures of the first building layer and/or along an interior surface of the first building layer. A limitation of this approach is that generally only a limited quantity of the thermoplastic material may be liquefied at the location where anchoring is most effective, for example distally of the first building layer.

WO 2009/052644 discloses methods of anchoring an anchoring element in a construction object, wherein the method includes coupling mechanical vibration energy and a tensile force into a sonotrode and from the sonotrode into the anchoring element while at the same time a counter element is used to exert a counter force onto the anchoring element. Due to the effect of the vibration energy and the forces, material of the anchoring element is caused to be liquefied and to penetrate structures of the object in which it is anchored.

SUMMARY OF THE INVENTION

It is an object of the present invention to solve, or at least mitigate, parts or all of the above-mentioned problems.

To this end, there is provided a method of anchoring a connector element in a receiving object, the receiving object being a lightweight building element including a first (outer) building layer, and an interlining layer distally of the first building layer, wherein the first building layer is thinner and more dense (and generally also harder as far as the—average—hardness of the interlining layer is defined) than the interlining layer, and the receiving object being provided with a mounting hole for receiving the connector element, the mounting hole penetrating the first building layer and extending into or through the interlining layer, and the connector element having a distal end and a proximal end, the method including inserting the distal end of the connector element into the mounting hole in an insertion direction along an insertion axis; inserting a sleeve including a thermoplastic material into the mounting hole, the sleeve enclosing the connector element; causing a distally facing liquefaction face of the sleeve to be in contact with a proximally facing support face of the connector element;

transferring energy to liquefy at least a flow portion of the thermoplastic material of the sleeve and pressing the liquefaction face against the support face to cause at least a fraction of the flow portion to flow radially outward; and causing the flow portion to re-solidify, whereby the re-solidified flow portion anchors the connector element in the receiving object. Such a method provides for a strong engagement between the connector element and the receiving object without exposing the material of the receiving object to e.g. delamination or fissures.

In many embodiments, the receiving object further has a second (outer) building layer, the first and second building layers sandwiching the interlining layer. The second building layer may also be thinner and more dense (and harder as far as the average hardness of the interlining layer is defined) than the interlining layer. The second building layer in some embodiments has a same composition as the first building layer, whereas in other embodiments, depending on the requirements, the second building layer has a different composition.

The fact that the sleeve "encloses" the connector element means that it has a portion that interruptedly or uninterruptedly encloses at least a major part of the periphery of the connector element in at least one axial depth.

According to one embodiment the sleeve partially encloses the connector element. This embodiment can be used, for example, when a connector element is to extend out of the mounting hole of the receiving object.

In a group of embodiments, the proximally facing support face is formed as a shoulder of a broadening, for example a collar, of the connector element.

In embodiments, the flow portion is caused to flow into a region immediately distally of the first building layer ("underneath" the first building layer).

In a group of embodiments, the proximally facing support face defines an undercut with respect to radial directions— for example by facing proximally and radially inwardly, whereby a groove open towards proximally is generated, the outer wall of the groove being (part of) the proximally facing support face and generating the radial undercut. By this, the proximally facing support face does not only form part of the liquefaction interface but also serves as catch preventing the sleeve or portions thereof from being bent or otherwise evading towards radially outwardly due to the effect of the pressing force. This may be beneficial in view of the often limited strength of the interlining layer materials of lightweight building elements.

In embodiments, the connector element is provided with a first connector interface accessible from proximally and configured to engage with a mating second connector interface of another object, whereby the connector may serve as anchor for the further object.

In addition or as an alternative to serving as anchor, the connector may also be configured as a rivert. In other embodiments, therefore, the method includes providing the mounting hole as a through hole, providing a further object having a through hole aligned with the mounting hole, inserting the connector element from distally and inserting the sleeve from proximally, and causing the receiving object and the further object to be clamped between a foot portion of the connector element and a head portion of the sleeve element after the anchoring process.

In embodiments, the mounting hole is undercut distally of the first building layer, so that the mounting hole cross section is larger distally of ("underneath") the first building layer than at its mouth were it transverses the first building layer.

According to an embodiment, the sleeve and the connector element may be pre-assembled and inserted into said mounting hole simultaneously. Alternatively, the sleeve and the connector element may be inserted one after the other. By way of example, the connector element may be inserted before the sleeve. However, inserting the sleeve and the connector element as an assembly may provide for a simpler anchoring process, since it will not be necessary to maintain the position of, e.g., the connector element in the mounting hole while inserting the sleeve. It also facilitates having an insertion direction which is not directed vertically downwards, since the sleeve may have a close fit in the mounting hole.

According to an embodiment, the sleeve is unbonded to the connector element. Thereby, as different parts of the sleeve liquefy, the non-liquefied parts of the sleeve may be allowed to axially move along the connector element, while permitting the connector element to remain stationary. This facilitates obtaining a well-defined final position of the connector element.

According to an embodiment, the energy may be transferred by means of mechanical energy transfer, and preferably mechanical vibration. Mechanical vibration may generate friction heat where the sleeve interfaces the connector element and/or the receiving object. The mechanical vibration may be induced by a source of ultrasonic vibration in contact with, e.g., the sleeve. According to an embodiment, the source of ultrasonic vibration may be held out of contact with the connector element throughout the entire anchoring process. By pressing the sleeve axially into the mounting hole during vibration, liquefaction may be initiated at regions where the sleeve axially abuts the connector element and/or the receiving object.

According to an alternative embodiment, a mechanical energy transfer may include causing the sleeve and the connector element to be subject to a relative rotation around the axis. To this end according to a first possibility the connector element is held at a fixed orientation by a holding tool while the sleeve is subject to rotation while being pressed against the proximally facing support face of the connector element. According to a second possibility, the sleeve is held in a fixed orientation around the axis by a pressing tool that presses the sleeve against the support face of the connector element while the connector element is subject to rotation around the axis. Further variants with for example both, the sleeve and the connector element being rotated, for example in opposed directions, are possible also. Engagement structures for the tools (tool that fixes the orientation/pressing tool/rotating tool) to engage may for example be inner engagement structures of the sleeve/the connector element. Such torque transferring engagement structures may be similar to according known structures, such as polygon structures, multi-lobe structures, star-like structures etc. as known for anti-rotation means or for rotary drives.

Combinations of mechanical vibration energy transfer and rotation energy transfer and/or other kinds of energy transfer are possible also. Thus, it is for example possible that only a portion of the energy is transferred by mechanical vibration while for example also heat and/or mechanical rotation is transferred.

According to an embodiment, the liquefaction of the thermoplastic material may be initiated at a liquefaction initiation interface between the sleeve and the connector element. Thereby, the location where the liquefaction will start will be well defined by the design and tolerances of the sleeve and connector element, resulting in an accurate and reproducible anchoring process. Moreover, the risk of damaging the material of the receiving object is minimized, since no pressure and/or frictional load needs to be applied between the sleeve and the receiving object. The liquefaction may be initiated at the liquefaction initiation interface by applying an axial force between the sleeve and the connector element, and moving the sleeve relative to the connector element (and in addition relative to the receiving object; the movement especially being a movement into a distal direction) to generate friction heat. According to an embodiment, said liquefaction initiation interface may be located at a distal end of the sleeve. Thereby, a deep anchoring of the connector element is warranted. The liquefaction initiation interface may be formed by the interface between the axial end of the sleeve and a collar of the connector element extending radially, with respect to the insertion axis, from a body portion of the connector element. Such a collar may be arranged at the distal end of the connector element. Alternatively, the connector element may include a distal portion arranged distally of such collar.

In an embodiment, such collar extends uninterruptedly around the connector element, for example at its distal end.

In an alternative embodiment, the collar is not uninterrupted but is constituted by a plurality of radial protrusions of the connector element. Such radial protrusions may for example be tooth shaped.

In an embodiment, such collar has a radial extension corresponding to a radial extension of the sleeve or at least of a distal portion thereof that will be liquefied during the process.

In an alternative embodiment, such collar has a radial extension that is smaller than a radial extension of the distal portion of the sleeve.

According to an embodiment, the energy may be transferred to sequentially liquefy a plurality of axially separate portions of the thermoplastic material of the sleeve. By liquefying the axially separate portions sequentially, the liquefaction energy may be consecutively concentrated to each axially separate portion. Thereby, liquefaction may be obtained along a substantial portion of the axial length of the connector element, with only a moderate transfer of liquefaction energy to the sleeve. This may be particularly useful in combination with a connector element of a thermally highly conductive material, such as metal, since the high thermal conductivity may otherwise limit the flow range of the liquefied material. The axially separate portions of the thermoplastic material of the sleeve may be liquefied in a consecutive order from the distal end to the proximal end. The axially separate portions of the thermoplastic material of the sleeve may be sequentially liquefied by sequentially engaging with respective different portions of the connector element, such as shoulders and/or radial collars, and/or shoulders of the mounting hole wall.

According to an embodiment, the distal end of the connector element or another distally facing abutment face of the connector element may be moved into an axial end position, in which it abuts an axial support face of the mounting hole, prior to liquefying said at least a portion of the thermoplastic material. Thereby, the connector element may be held stationary against the axial support face throughout the entire anchoring process, allowing its final position to be accurate and well defined. Such axial support face may for example be formed by the inner surface of the second building layer.

According to an embodiment, the method may further include allowing at least a portion of the liquefied thermoplastic material to axially enclose a structure extending radially from a body of the connector element, and thereafter allowing the liquefied thermoplastic material to solidify to provide axial support between the connector element and the sleeve. The radially extending structure may, by way of example, include a collar enclosing, and extending radially from, a body portion of the connector element. Alternatively, if the energy is mechanical vibration energy or other energy different from mechanical rotation energy, the radially extending structure may be formed as a bump or a plurality of bumps. Generally, extending structures that are different from a circumferential collar also provide support against relative rotational movement. Such structures that provide support against relative rotational movement are often less advantageous, however, for embodiments in which the energy is mechanical rotation energy.

In addition or as an alternative to the radially extending structure, the connector element may include at least one indentation into which material of the sleeve may engage to provide axial support and possibly also support against relative rotational movement.

According to an embodiment, especially if the energy is mechanical vibration energy or other energy different from rotation energy, the method may further include allowing at least a portion of the liquefied thermoplastic material to enclose a tangentially (azimuthally) varying surface structure of the connector element, and thereafter allowing the liquefied thermoplastic material to solidify to provide rotation resistance to the engagement between the connector element and the sleeve. The tangentially varying structure may, by way of example, include ridges on a radial collar, the ridges extending in the radial and/or axial direction.

The method may include moving a proximal end of the sleeve in the insertion direction relative to the connector element while said at least a portion of the sleeve is liquefied. This may press liquefied thermoplastic into any spaces in the region of the interlining layer.

According to an embodiment, the connector element may be inserted into the mounting hole to a position in which it is flush with, or countersunk into, an outer surface of the receiving object. Also the sleeve may, alternatively or additionally, be moved to a position in which a proximal end of the sleeve is flush with, or countersunk into, the outer surface of the receiving object. This may reduce the risk that any respective protruding parts interfere with or get squeezed below an object to be attached to the receiving object via the first and second connector interfaces.

According to another aspect of the invention, parts or all of the above mentioned problems are solved, or at least mitigated, by a connector element anchoring kit being a lightweight building element including a first building layer, and an interlining layer distally of the first building layer, wherein the first building layer is thinner and has a higher density than the interlining layer, the kit including a connector element configured to be anchored in a receiving object, the connector element having a relatively non-thermoplastic body with a distal end for inserting into a mounting hole of the receiving object in an insertion direction along an insertion axis, and a proximal end, the connector element anchoring kit further including a sleeve including a thermoplastic material, the sleeve having a distal end and a proximal end, and being configured to receive and enclose the connector element, and the kit being configured to carry out the method as described hereinbefore. Using such a kit, a connector element may be anchored in the mounting hole. This provides for a strong engagement without exposing the material of the receiving object to, e.g., delamination or fissures.

According to an embodiment, the sleeve may include a plurality of axially separated shoulder portions configured to engage with a plurality of axially separated support faces of the connector element, to liquefy the sleeve at a plurality of axially separate melting regions. Thereby, the connector element may be anchored at several axial locations. The shoulder portions of the sleeve may optionally be located at axial positions preventing them from simultaneously engaging with the respective support faces of the connector element, such that one melting region can only engage after the shoulder portion of another melting region has liquefied. The shoulder portions may for example be axially arranged so as to liquefy in a consecutive order, e.g., starting from the distal end of the sleeve.

According to an embodiment, the connector element may have a collar extending radially, with respect to the insertion axis, from the body, and the sleeve may, at its distal end, have an inner cross-section which is smaller than the cross-section of the collar, wherein the connector element is insertable into the sleeve to a bonding start position in which the collar axially engages with the distal end of the sleeve. The collar may form an anvil for the sleeve, thereby inducing melting of the collar at the distal end of the connector element, which may be located at the bottom of the mounting hole. The collar may form a continuous or interrupted ridge enclosing the body. The ridge may follow a plane perpendicular to the insertion direction. The collar will, together with re-solidified thermoplastic material, form a bond having a high axial strength between the connector element and the sleeve, and particularly against pulling the connector element in a direction opposite to the insertion direction.

According to an embodiment, the sleeve may be configured to enclose the connector element with a radially loose fit at least at all axial positions except the distal end. This reduces the risk that the sleeve will start melting at other axial positions than at the distal end. The term "radially loose fit" is to be construed as not being friction fit—it does not imply the presence of a gap. According to an embodiment, also the distal end of the sleeve may have a radially loose fit.

According to an embodiment, the connector element may include at least one intermediate collar, located in an intermediate region between the proximal and distal ends and extending radially, with respect to the insertion axis, from the body, and the sleeve may include an inwards facing circumferential slot for receiving the intermediate collar. The intermediate collar may increase the axial strength of the anchored engagement between the connector element and the receiving object, and in particular, against pushing the connector element in the insertion direction. This may be of particular value if the mounting hole is a through hole, or if the mounting hole extends almost all the way through the receiving object, leaving only a thin, weak bottom wall. Thereby, substantial material savings can be made, since the thickness of the receiving object can kept low with maintained axial strength of the anchoring in the insertion direction. According to an embodiment, the connector element is insertable into the sleeve to be held at a bonding start position in which the intermediate collar is received in the circumferential slot, and the intermediate collar is axially separated from a proximal edge delimiting the circumferential slot. Thereby, the proximal edge of the circumferential slot will not engage with the intermediate collar until the liquefaction process has already been initiated elsewhere. This facilitates obtaining axially separated melting regions.

According to an embodiment, the sleeve may include a proximal end liquefaction collar of thermoplastic material. The liquefaction collar may include a surface structure for increasing the friction between the liquefaction collar and the connector element, such as, especially if the energy is mechanical vibration energy or other energy different from rotation energy, ridges extending axially along the outer face of the sleeve. The connector element may be insertable into the sleeve to a bonding start position in which the liquefaction collar is located on a proximal side of, and does not overlap with, the connector element as seen in a direction perpendicular to the insertion axis. Thereby, even if the connector element is entirely received in the mounting hole of the receiving object, the liquefaction collar may be held axially separated from the circumferential edge of the mounting hole in the initial phase of the bonding process. This means that the liquefaction collar will not engage with the receiving object and liquefy until a more distal portion of the sleeve has already liquefied.

According to an embodiment, a majority of the outer surface of the sleeve may be smooth, so as to avoid excessive friction and accidental liquefaction at other regions of the outer surface than those intended, such as at the liquefaction collar.

According to an embodiment, the sleeve may be at least 20% longer than the connector element, as seen along the insertion axis. Thereby, an axial pressure may be maintained on the sleeve while it liquefies and shrinks axially.

According to an embodiment, the connector element may be pre-mounted in the sleeve to form a connector assembly. Such an arrangement may render the machinery implementing the anchoring process simpler.

According to an embodiment, the connector element may be configured to engage with the sleeve in a bonding start position in an interlocking manner. Such an arrangement may render the machinery implementing the anchoring process simpler. According to embodiments, the sleeve may, when interlocking with the connector element, extend beyond the connector element in the proximal direction by at least 20%, or at least 30%, of a total length of the sleeve.

According to an embodiment, the sleeve, as seen in a section perpendicular to the insertion axis, may be substantially circular with its centre axis coinciding with the insertion axis. Such a sleeve is particularly well suited for circular mounting holes. Similarly, the connector element may be circular as seen in said cross-section.

According to an embodiment, the sleeve may include a proximal end collar extending radially inwards to, when enclosing the connector element, at least partly cover the connector element as seen along the insertion direction. Such a design may provide additional axial support to the connector element. Moreover, the proximal end collar may have the same colour as the outer surface of the receiving object adjacent to the hole, such that the connector element will blend into the surface of the receiving object.

In addition or as an alternative to an end collar extending radially inwards, the sleeve may include a head portion, for example formed by a flange (for example proximal end collar) extending radially outwardly.

According to yet another aspect of the invention, parts or all of the above-mentioned problems are solved, or at least mitigated, by a machine configured for carrying out the process according to any of the methods described hereinabove. The machine may be configured to perform the process using any of the connector element anchoring kits described hereinabove.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals are used for same or functionally equivalent elements, wherein:

FIG. 1b is a perspective view of a section of the connector element of FIG. 1a, as seen along the arrows B-B of FIG. 1a;

FIG. 2b is a perspective view of a section of the sleeve of FIG. 2a, as seen along the arrows B-B of FIG. 2a;

FIGS. 15a and 15B are schematic views in section of the distal end of a further connector piece, wherein FIG. 15b shows a section along plane B-B in FIG. 15a;

DETAILED DESCRIPTION OF THE INVENTION

Figure 1A:
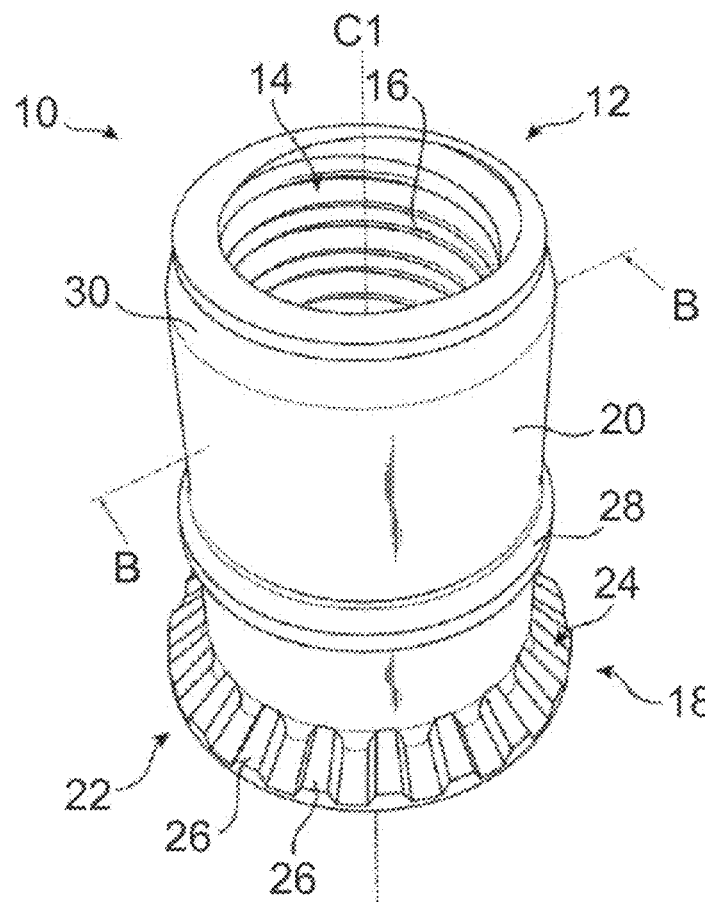
FIG. 1a is a diagrammatic view in perspective of a connector element according to a first embodiment.

FIG. 1a illustrates a connector element 10 for anchoring in a receiving object, The connector element 10 has a proximal end 12 provided with a connector interface 14, which in the illustrated embodiment is configured as a female connector interface and includes an internal thread 16 for engaging with a screw (not shown) provided with a mating outer thread. The connector element 10 further has a distal end 18 for inserting into a mounting hole (not illustrated) of the receiving object. The connector element 10 has a generally circular cylindrical body 20, the circular cylindrical shape of which is coaxial with the circular cylindrical shape of the threaded female connector interface 14. At its distal end 18, the connector element 10 has a circumferential distal end collar 22 extending radially, with respect to a centre axis C1 of the circular cylindrical shape, from the body 20. The proximal face 24 of the distal end collar 22 serves as a proximally facing support face of the connector element. It slopes in the distal direction, and has a surface structure defined by a plurality of radial ridges 26. At an intermediate region between the proximal and distal ends 12, 18, the connector element 10 is provided with a circumferential, intermediate collar 28 extending radially, with respect to the centre axis C1, from the body 20. At the proximal end 12, the connector element 10 tapers to define a circumferential shoulder 30 sloping towards the distal direction.

Figure 1B:
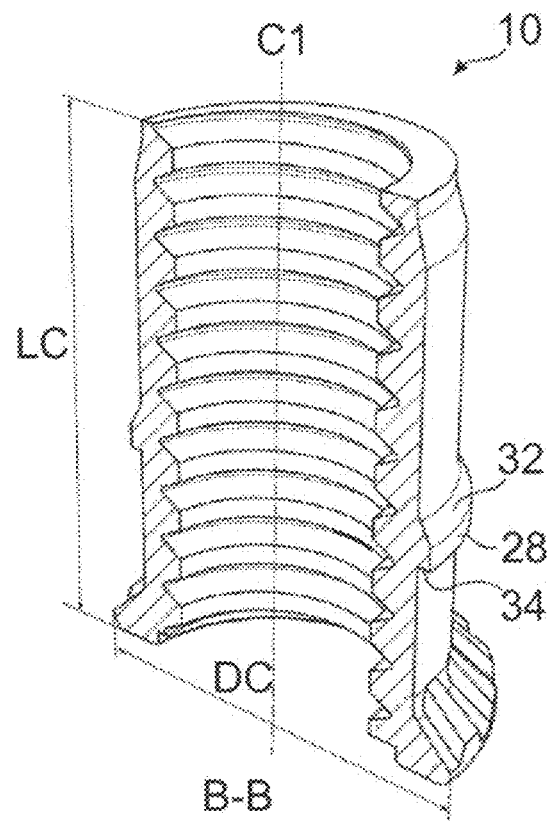

FIG. 1b illustrates the connector element 10 in section, as indicated by arrows B-B in FIG. 1a. As can be seen in FIG. 1b, the intermediate collar 28 has a proximal face 32 sloping in the distal direction, and a distal face 34 which lies in a plane substantially perpendicular to the centre axis C1. The connector element 10 has a total length LC, which may typically be between 5 mm and 40 mm. The connector element 10 also has a diameter, which varies along the length of the connector element 10, and reaches its largest value DC at the distal end collar.

Figure 2A:
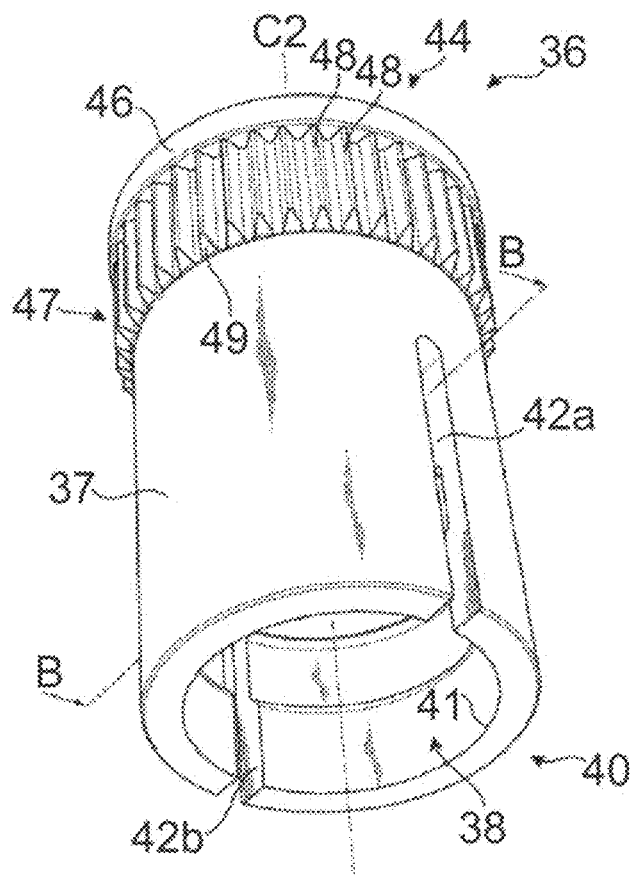
FIG. 2a is a diagrammatic view in perspective of a sleeve according to a first embodiment.

FIG. 2a illustrates a sleeve 36 made of a thermoplastic material. The sleeve 36 has a smooth, generally circular cylindrical outer face 37, and a circular cylindrical inner opening 38 configured to receive and enclose the connector element 10 in a manner that will be elucidated further below. The inner and outer circular cylindrical shapes 37, 38 of the sleeve 36 are coaxial with a centre axis C2 of the sleeve. At a distal end 40, the sleeve 36 is provided with a pair of expansion slots 42a-b extending from the distal end towards the proximal end 44 of the sleeve 36. An inner, distal edge of the sleeve 36 defines a distal liquefaction shoulder 41. At the proximal end 44, the sleeve 36 includes a rim 46 extending radially, with respect to the centre axis C2, from the sleeve 36. A proximal end liquefaction collar 47 is defined by a plurality of friction ridges 48, which extend along the direction of the centre axis C2 and are distributed about the periphery of the outer face 37. Distal ends of the friction ridges 48 define a proximal liquefaction shoulder 49 facing in the distal direction.

Figure 2B:
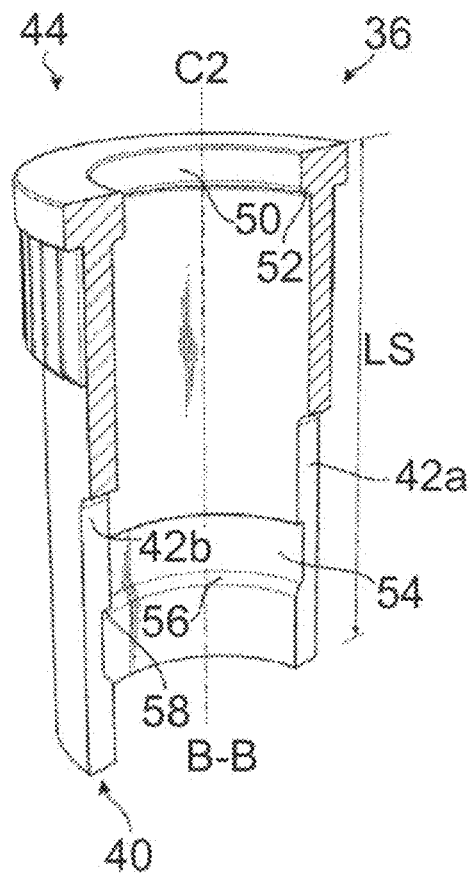

FIG. 2b illustrates the sleeve 36 in section, as indicated by arrows B-B in FIG. 2a. As can be seen in FIG. 2b, the proximal end 44 is provided with an inwards extending rim 50, which defines a proximal end inner shoulder 52 facing in the distal direction. At an intermediate region between the proximal and distal ends 44, 40, the sleeve 36 is provided with an inwards facing circumferential slot 54 for receiving the intermediate collar 28 of the connector element 10 (FIG. 1a). A distal edge 56 of the slot 54 slopes in the distal direction, whereas a proximal edge of the slot 54, defining an intermediate liquefaction shoulder o, is substantially parallel to a plane perpendicular to the centre axis C2. The sleeve has a total length LS, which may, by way of example, typically be between 7 mm and 60 mm.

Together with the connector element 10 of FIGS. 1a-b, the sleeve 36 defines a connector element anchoring kit. For assembling the connector anchoring kit 60 to form a connector, the proximal end 12 of the connector element 10 is pressed into the distal end 40 of the sleeve 36 along an assembly direction, During insertion, the expansion slots 42a-b permit the distal end 40 of the sleeve 36 to resiliently expand, allowing the intermediate collar 28 of the connector element 10 to be pressed into the circumferential slot 54 of the sleeve 36. Once the intermediate collar is in the circumferential slot, the distal end 40 of the sleeve 36 resiliently contracts, bringing the sleeve 36 and connector element 10 in interlocking engagement. In this configuration, the distal liquefaction shoulder 41 engages with the distal end collar 22, whereas the intermediate liquefaction shoulder 58 is axially separated from the intermediate collar 28. The engagement between the distal face 34 (FIG. 1b) of the intermediate collar 28 and the distal edge 56 (FIG. 2b) of the slot 54 maintain the sleeve 36 and connector element 10 in interlocking engagement. The sleeve 36 encloses the connector element 10 with a radially loose fit along the entire axial length. The sleeve 36 is longer than the connector element 10, and extends beyond the connector element 10 in the proximal direction.

Figure 3:
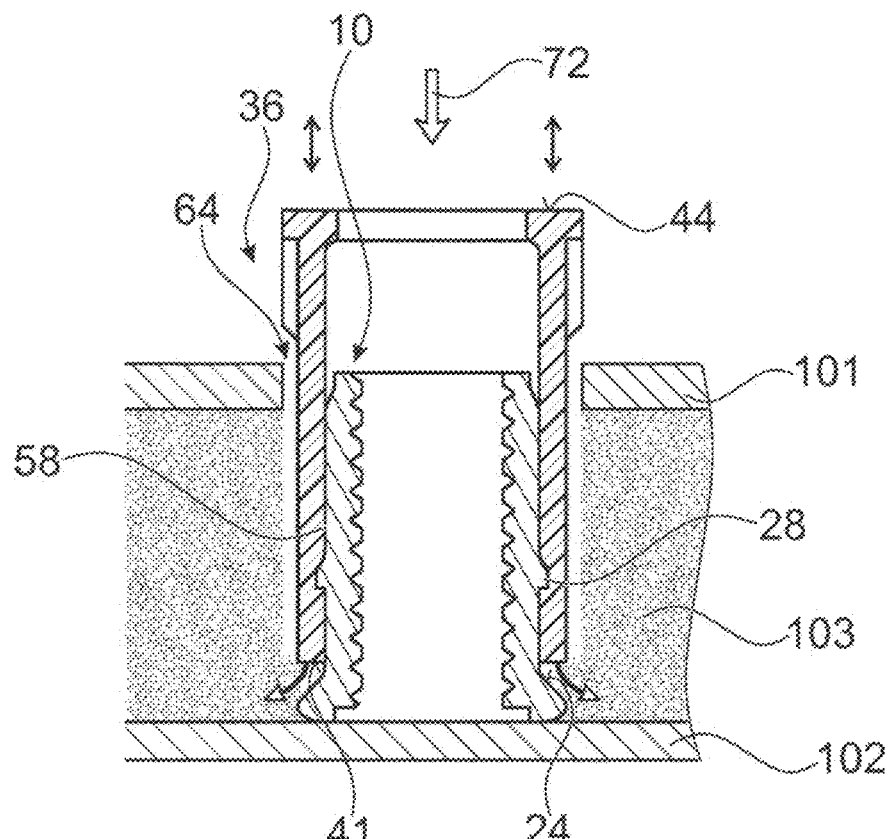
FIG. 3 is a schematic view in section of the connector assembly including the connector of FIGS. 1a and 1b as well as the sleeve of FIGS. 2a and 2b during the anchoring process.
Figure 4:
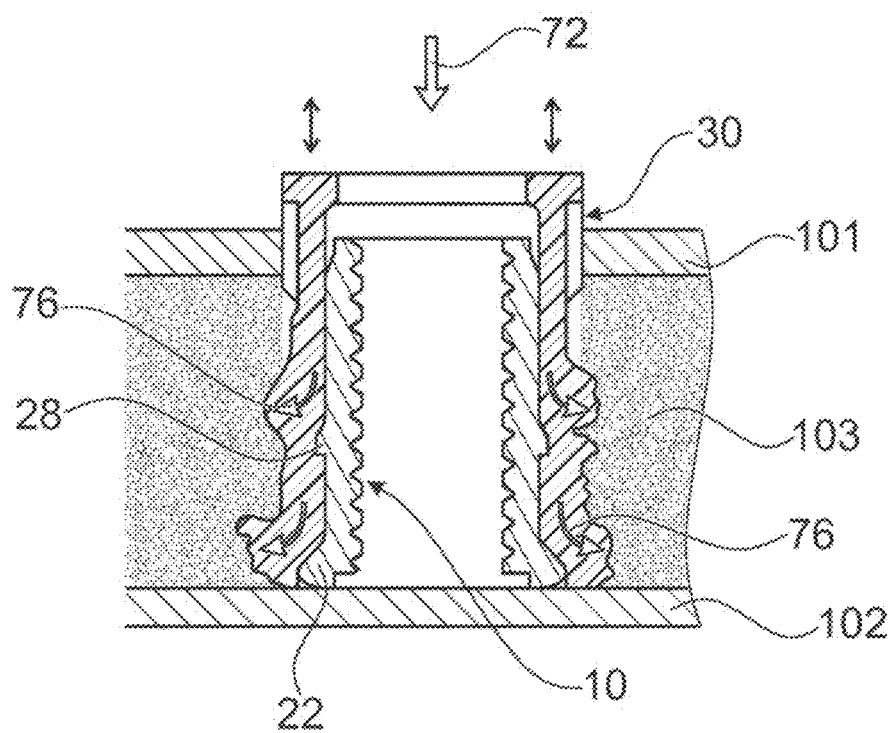
FIG. 4 is a schematic view in section of the connector assembly of FIG. 3 at a later stage of the anchoring process.

FIGS. 3 and 4 illustrate a bonding process for anchoring the connector element 10 in the receiving object 66 being a lightweight building element.

Such lightweight building elements include two comparably thin building layers, for example of a fiber composite, such as a glass fiber composite or carbon fiber composite, a sheet metal or also, depending on the industry, of a fiberboard, and a middle layer (interlining) arranged between the building layers, for example a honeycomb structure of cardboard or other material, or a lightweight metallic foam or a polymer foam or ceramic foam, etc., or a structure of discrete distance holders. In the embodiment of FIGS. 3 and 4, the interlayer is depicted to be a foam material, whereas in other embodiments described hereinafter, the interlining layer is shown as honeycomb layer.

The lightweight building element of FIGS. 3 and 4 therefore includes a first building layer 101, a second building layer 102, and an interlining layer 103 sandwiched between the first and second building layers.

The connector including the connector element 10 and the sleeve 36 is inserted in a mounting hole 64 in the lightweight building element, which mounting hole 64 penetrates through the first building layer 101 and, in the depicted embodiment, also through the interlining layer 103. FIG. 3 shows the configuration at the onset of the anchoring process.

During anchoring, ultrasonic vibration energy is transferred to the sleeve by means of a sonotrode (not illustrated), which engages with the proximal end 44 of the sleeve 36. The sonotrode applies axial pressure in the direction of the arrow 72, and vibrates the sleeve 36 so as to generate friction heat at interfaces between the sleeve 36 and the connector element 10.

For the anchoring process, the sonotrode presses the sleeve towards distally and thereby presses the distal liquefaction shoulder 41 of the sleeve 36 against the distal end collar 22 of the connector element 10. The engagement between the distal liquefaction shoulder 41 and the proximal face 24 defines a distal liquefaction initiation interface. Friction heat generated by the sonotrode's ultrasonic vibration at the distal liquefaction initiation interface 74 liquefies the thermoplastic material of the sleeve's distal end, as illustrated in FIG. 3. As the sonotrode continues to vibrate, and push the sleeve 36 along the insertion direction, liquefied thermoplastic of the sleeve 36 is caused to flow radially outwardly and into the region of the interlining layer 103 (see arrows in FIG. 3).

The flow portion of the liquefied thermoplastic material is pressed into the material of the interlining layer adjacent to the connector element's 10 distal end. The distal end collar 22 defines a comparatively liquid-tight bottom of the liquefied thermoplastic-filled gap between the connector element 10 and the inner wall of the mounting hole 64, and thereby guides liquefied thermoplastic 76 radially outwardly and into structures of the interlayer, such as into pores of the foam. Liquefied thermoplastic also engages with the surface structure of the distal end collar 22, to later form an engagement against rotational relative movements of the sleeve and the collar once the thermoplastic subsequently cools off and solidifies.

As the sleeve 36 moves along the insertion direction, the sleeve's 36 intermediate liquefaction shoulder 58 is brought into engagement with the intermediate collar's 28 proximal face 32, so as to form an intermediate liquefaction initiation interface.

As the pressing force 72 and the mechanical vibration are kept being applied, the sonotrode presses the intermediate liquefaction shoulder 58 against the intermediate collar 28 of the connector element 10. Friction heat generated by the sonotrode's ultrasonic vibration at the intermediate liquefaction initiation interface liquefies the thermoplastic of the sleeve's 36 intermediate portion, as illustrated in FIG. 4. As the sonotrode continues to vibrate, and push the sleeve 36 along the insertion direction, liquefied thermoplastic 76 of the sleeve 36 continues to be pressed into the material of interlining layer Depending its material composition, the mounting hole 64 may be undercut distally of the first building layer 101, i.e., the mounting hole cross section may be larger in the region of the interlining layer than where it penetrates the first building layer. By this measure, the thermoplastic material may encounter less resistance against a radial outward flow. Such undercut mounting hole may, for example, be manufactured by a drilling tool capable of oscillating about its axis. In addition or as an alternative, the undercut may be caused by the process, especially with foams of relatively low density as interlining layers, which by the hydrostatic pressure of the liquefied thermoplastic material are radially compressed. Also open porous structures with large pores may cause, by the porosity itself, allow for an underflow of the first building layer.

Once a desired position has been reached the pressure and vibration ceases, e.g., by de-energizing the sonotrode or disengaging it from the sleeve 36, and the thermoplastic 76 is allowed to re-solidify. The top of the sleeve 36 remains intact throughout the anchoring process and, in the final position extends beyond the connector element 10 in the direction opposite to the insertion direction. In the illustrated example, the connector element 10 has an axial length LC (FIG. 1b) shorter than and axial depth of the mounting hole 64, such that it will be slightly countersunk into the mounting hole 64 when in the final position. Thereby, accidental contact between the sonotrode and the connector element 10 may be avoided, since the surface of the receiving object 66 may act as an end stop for the sonotrode. During bonding, the proximal end inner shoulder 52 (FIG. 2b) of the sleeve 36 may have been liquefied by the friction engagement with the circumferential shoulder 30 (FIG. 1a) of the connector element 10 to tightly embed the shoulder 30; alternatively, the anchoring process may be halted before the proximal end inner shoulder 52 reaches the circumferential shoulder 30 of the connector element 10.

In the final position, the sleeve 36 may protrude above the surface of the receiving object 66. In a slight variation, the process may instead continue until the proximal end 44 of the sleeve 36 reaches a position where it is flush with the surface of the receiving object 66. In another variation, the third bonding step may continue until the proximal end 44 of the sleeve 36 reaches a position where it is countersunk into the receiving object 66.

Given the configuration shown in FIGS. 3 and 4, the anchoring strength achievable, especially against pull-out forces, may, depending on the interlining material, be only moderate, since the dimensional stability of the interlining material itself may be limited. In situations where this is not acceptable, measures discussed hereinafter may be taken. For example, the illustrated second (intermediate) liquefaction interface may be more proximally than shown in FIGS. 3 and 4, or a third liquefaction interface arranged more proximally than the second liquefaction interface may be present, so that at least a part of the flow portion flows into the space immediately distally of the first building layer.

Also, the expansion slots 42a, 42b may be omitted to prevent the thermoplastic material of the sleeve from being pushed towards radially outwardly prior to its liquefaction.

Figure 5:
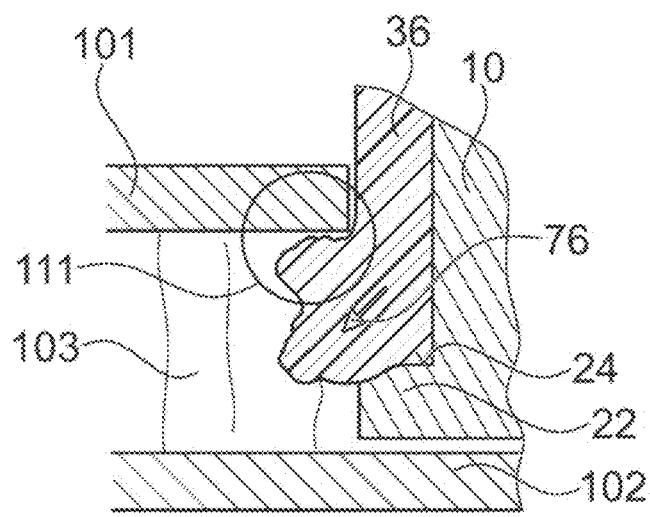
FIG. 5 is a schematic view in section, in part, of an alternative connector assembly at a late stage of the anchoring process.

FIG. 5 illustrates the principle of anchoring in a region immediately distally of the first building layer, in a sub-building-layer region 111. The flow portion 76 of the thermoplastic material according to this principle fills a space between the proximally facing support face 24 and first building layer (or, to be precise, it's distally facing surface) adjacent the mouth of the mounting hole formed in the first building layer. Thereby, the flow portion 76 together with the connector element 10 forms a kind of rivet and is secured against pulling movements out of the receiving object by the strength and dimensional stability of the first building layer.

In FIGS. 1a and 1b the proximally facing support face 24 is shown to be sloping away from the body 20 of the connector element 10, i.e., the support face 24 faces towards proximally and radially outwardly. Such configuration is especially advantageous in situations where material around the mounting hole has a high dimensional stability thereby guiding the sleeve and counteracting any outward movement and flow of portions of the sleeve and liquefied thermoplastic material thereof, respectively. The tapering shape of the support face therein assists the desired radial outward flow.

However, in situations in which the material around the mounting hole is comparably weaker, which will often be the case for interlining layers, then a substantial slope away from the axis may counteract the desire to cause the thermoplastic material to flow to immediately distally of the first building layer 101. To this end, the support face 24 in the example of FIG. 5 is illustrated to be almost perpendicular to the axis, sloping away from the axis only slightly.

Figure 6:
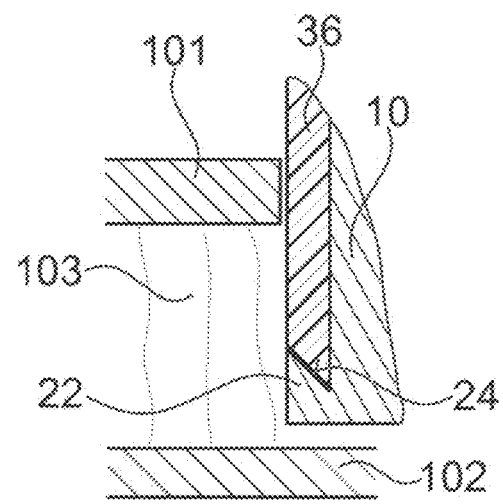
FIG. 6 is a schematic view in section, in part, of yet another connector assembly at an early stage of the anchoring process.

In other embodiments, especially if the sleeve is comparably thin and/or if the interlining material is removed around the mounting hole and/or offers little resistance, then it may even be desirable to configure the connector element to include a catch preventing the sleeve from being deformed towards radially outwardly and radially confining the non-liquefied portions of the sleeve. Such a configuration is illustrated in FIG. 6. The proximally facing support face 24 faces towards proximally and radially inwardly, whereby the connector element forms an undercut with respect to radial directions and the support face 24 together with the anchoring element body 20 defines an overall concave surface. By this, any sliding outwardly of softened but not yet flowable portions of the sleeve is prevented. The thermoplastic material may escape towards radially outwardly only when it is fully liquefied.

Figure 7:
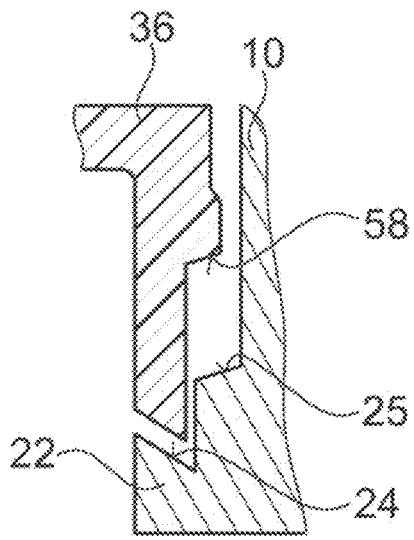
FIG. 7 is a schematic view in section, in part, of an even further connector assembly at an early stage of the anchoring process.
Figure 8:
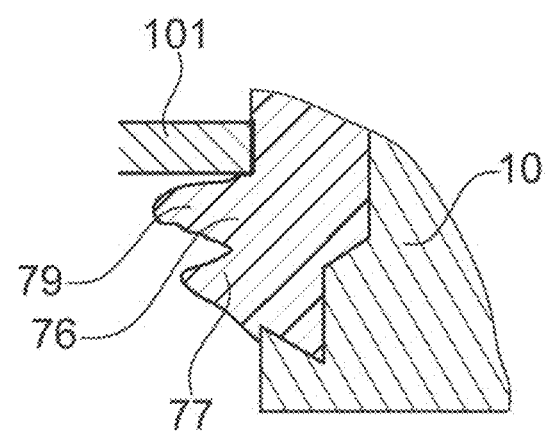
FIG. 8 is schematic view in section, in part, of the assembly of FIG. 7 after the anchoring process.

FIG. 7 shows a variant with a first proximally facing support face 24, the first proximal support face forming an undercut with respect to radial directions and thereby serving as a catch of the kind described with respect to FIG. 6. A second proximally facing support face 25 may, but does not need to, be undercut with respect to radial directions also. It cooperates with a liquefaction shoulder 58 of the kind described hereinbefore to liquefy portions of the thermoplastic material after some first portions have been liquefied in contact with the first proximally facing support face 24 and the sleeve has been correspondingly shortened in the process. FIG. 8 shows the result with the flow portion 76 having two main contributions 77, 79 from the first and second liquefaction interface, respectively. Also in this embodiment, the flow portion fills a space between at least one of its proximally facing support faces and the first building layer 101.

Figure 9:
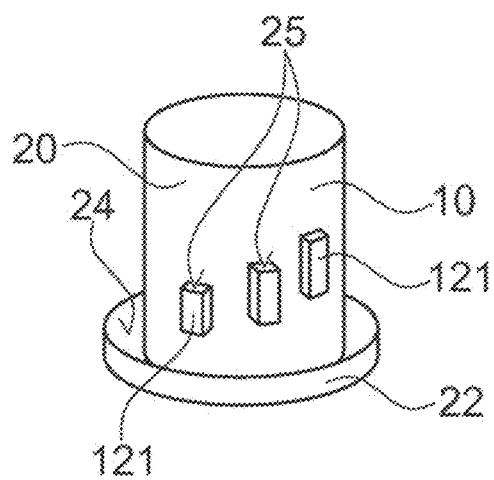
FIG. 9 is a schematic view of a further connector element.

FIG. 9 shows a variant in which the first proximally facing support face 24 again defines an undercut with respect to radial directions (namely, a circumferential groove open towards proximally). In contrast to the embodiment of FIGS. 7 and 8, the second proximally facing support face 25, however, is distributed by belonging to a plurality of radial protrusions 121 distributed around the periphery of the anchoring element body 20 at equal or different axial positions. The radial protrusions 121 in addition to serving to define the second support face 25 also may serve to stabilize the connector element against the sleeve after anchoring, as described in more detail hereinafter referring to FIG. 12.

Figure 10:
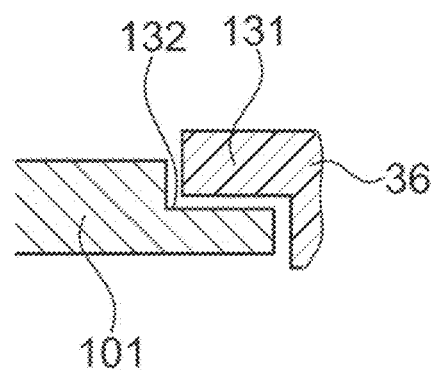
FIG. 10 is a detail of a sleeve and a first building layer shown in section.

FIG. 10 depicts a detail which may be optional for any embodiment of the invention. Namely, the sleeve has a flange portion 131 which secures it against radial inward movements at the end of the anchoring process and thereafter. The first building layer 101 may optionally have a shallow indentation 132 along the mounting hole to receive the flange portion in case it is desired that the connector, or at least the sleeve thereof, is essentially flush with the outer surface of the receiving object at the end of the process.

Figure 11:
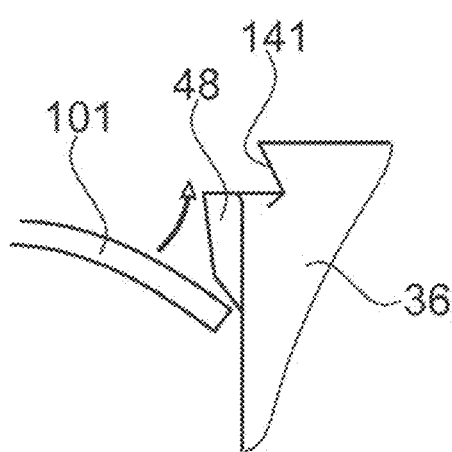
FIG. 11 is a schematic illustration of an optional principle.

FIG. 11 firstly depicts a principle that is applicable to receiving objects having a first building layer 101 that has substantial resilience. In the anchoring process, the first building layer may be deformed to be deflected inwardly by a corresponding feature—for example the distal end faces of ridges 48 of the kind shown in FIGS. 2a/2b—of the sleeve. Then, due to the rising resilient force and/or a declining resistance of the sleeve material that softens and becomes flowable where friction with the receiving object arises, the first building layer flexes back to its original position, as illustrated by an arrow in FIG. 11.

Secondly, FIG. 11 shows a receiving volume 141 of the connector for the first building layer 101. Such receiving volume may have an axial undercut, as shown in FIG. 11. If the first building layer along the rim of the mounting hole is accommodated in such receiving volume, this gives additional stability for the anchoring. Such receiving volume is an option also for embodiments in which the first building layer is not flexible. Then, the sleeve material distally of the receiving volume is made flowable in the process of inserting the sleeve to stabilize, after re-solidification, the sleeve against the first building layer.

Figure 12:
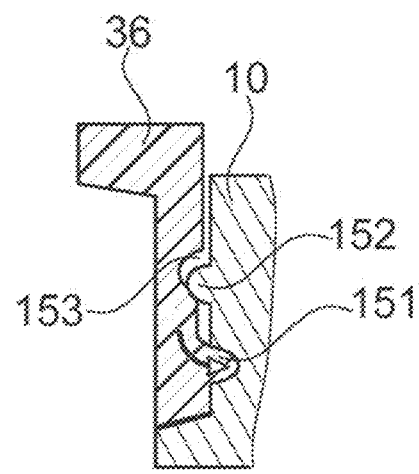
FIG. 12 is a schematic view in section, in part, of yet another connector assembly.

FIG. 12 shows the principle of the connector element 10 having indentations 151 and/or protrusions 152 for cooperating with sleeve material to give an additional axial and/or rotational stability. In this, indentations 151 may be filled during the process by liquefied thermoplastic material of the sleeve to yield the desired positive-fit connection after the process. Alternatively, the sleeve 36 may be provided with pre-shaped protrusions for cooperating with the indentations, and may be configured to be slightly flexible for insertion. Concerning the protrusions 152, the sleeve may include pre-shaped indentations 153, or alternatively such indentations may form in the course of the process by thermoplastic material being liquefied.

Many lightweight building elements have a thickness of the interlining layer 103 that is too large for an only proximally facing support face 24 to be arranged at a collar 22 if the collar is at the distal end, if the connector element 10 is inserted into the mounting hole as far as to abut against the second building layer 102, and if the thermoplastic material is to flow into the sub-building-layer region 111. Therefore, the anchoring method in embodiments may include holding the connector element in a position in which it does not reach the second building layer. A possible disadvantage of this may be that, depending on machinery and interlining material, the position may be not as well defined as a position in which the connector abuts the second building layer as shown in FIGS. 3 and 4, for example.

Figure 13:
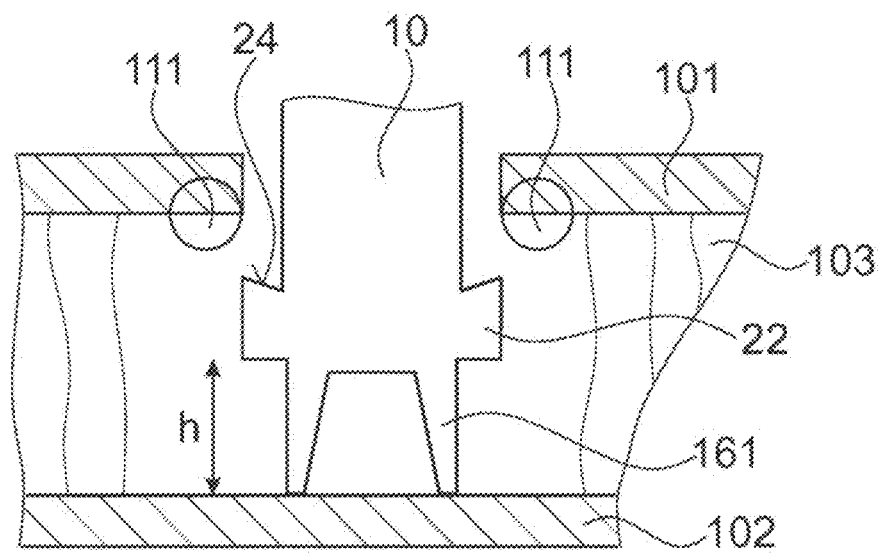
FIG. 13 is a schematic view in section, in part, of a receiving object and a connector piece with a distance holder.

FIG. 13 illustrates an embodiments in which the connector includes, distally of the collar 22 that defines the support face 24, a distance holding portion 161. The height h of such distance holding portion may be adapted to the thickness of the interlining layer 103 so that the flow portion flows into the sub-building-layer region 111 when the connector element 10 is in a position in which the distance holding portion 161 abuts the second building layer or another defined structure in the receiving object.

Figure 14:
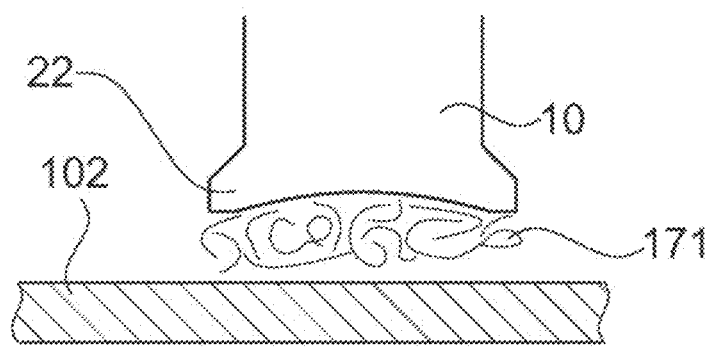
FIG. 14 is a schematic view in section, in part, of a second building layer and a connector piece with a distance holder.

FIG. 14 shows a variant in which the distance holding portion is formed by a reinforcement 171 between the distal end of the connector element and the second building layer 101.

Figure 15A:
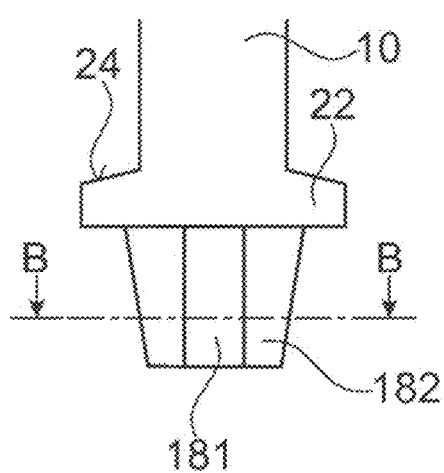
Figure 15B:

In the embodiment of FIGS. 15a and 15b, the distance holding portion is formed by a structure including a central element 181 and self-reaming wings 182 shaped to be advanced in to the interlining material even if the mounting hole is not as deep as to reach the second building layer. More generally, the distal end of the connector element 10 may be provided with any suitable drilling or reaming structure. For inserting the connector element, the connector element may be subject to mechanical movements adapted to such drilling or reaming structure, for example to rotational or vibrational movement.

Figure 16:
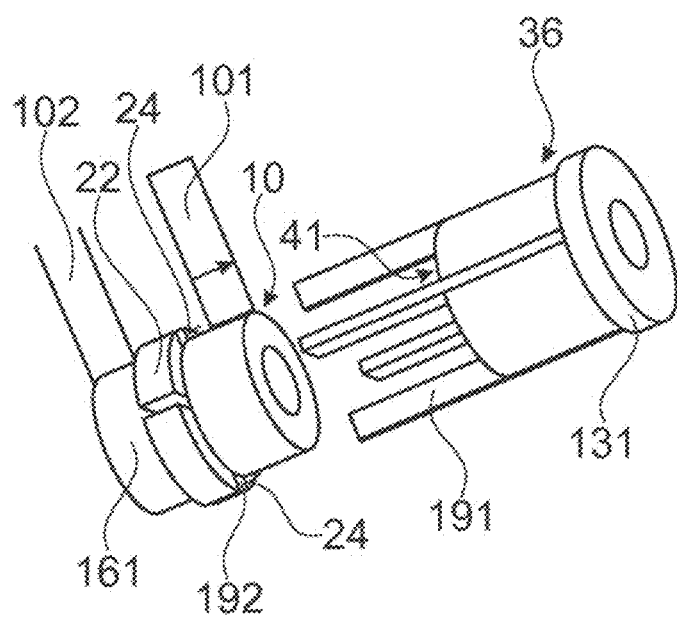
FIG. 16 is a view showing an even further connector assembly.

The embodiment of FIG. 16 realizes yet another optional principle. Namely, the sleeve is provided with a plurality of thermoplastic extensions 191 configured to reach beyond the connector element 10. To this end, the collar 22 of the connector element has an according number of interruptions 192 through which the extensions 191 may be slid. In the process, when the sleeve 36 is pressed towards distally with mechanical vibrations impinging on it, the distal ends of the extensions are pressed against structures of the receiving object, for example the proximally facing surface of the second building layer 102. This results in a liquefaction of the distal ends of the extensions and interpenetration of structures of the receiving object. Once as the distal liquefaction shoulder 41 is in contact with the support face, additional liquefaction will take place at this liquefaction interface, in accordance with the principle described hereinbefore. The liquefied and re-solidified thermoplastic material from the distal end of the extensions 191, by the interpenetration of structures of the receiving object, contributes to the anchoring of the connector.

Figure 17:
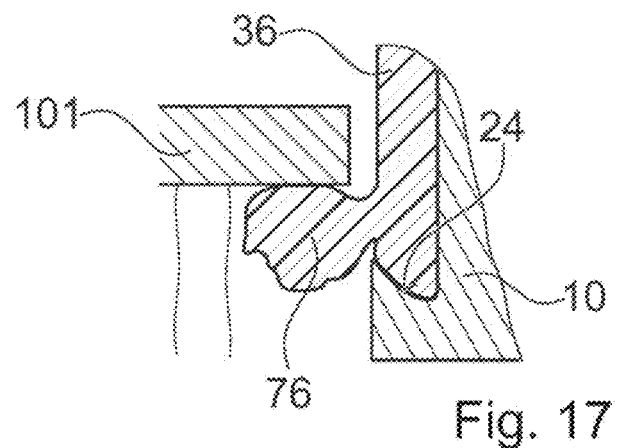
FIG. 17 is a schematic view in section, in part, of an alternative connector assembly at the end of the anchoring process.
Figure 18:
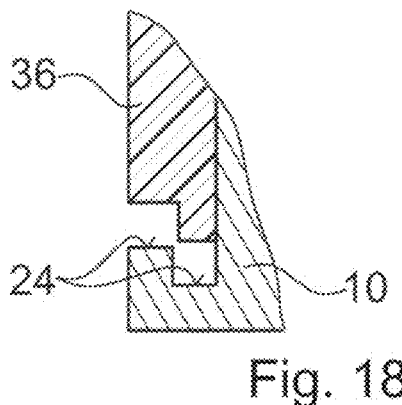
FIG. 18 is a schematic view in section, in part, of an even further alternative connector assembly.

FIG. 17 shows an alternative embodiment of a connector element structure with a proximally facing support face that defines an undercut with respect to radial directions. In contrast to the embodiments of, for example, FIGS. 7, 9 and 13 the face does not have a conical shape but is concave in axial section. Other shapes are possible. FIG. 18 shows a structure in which the proximally facing abutment surface has a stepped shape in which a groove with a rectangular cross section ensures the positive fit with respect to radial direction and thereby defines the catch.

Figure 19:
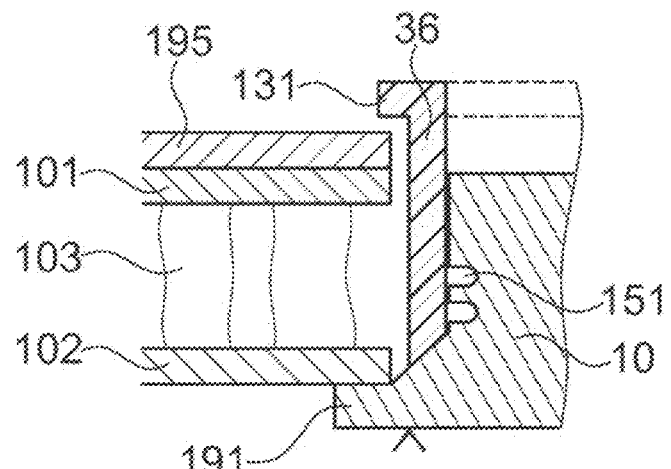
FIG. 19 is a schematic view in section, in part, of a further alternative connector assembly at the onset of the anchoring process.

In the previously described embodiments, the connector element was illustrated as belonging to a connector that serves as an anchor in the receiving for a further object to be fastened thereto. To this end, the connector element in FIGS. 1a and 1b has the connector interface 14. However, the connector does not need to include such connector interface 14. Rather, the connector may in some embodiments itself serve as the object to be anchored relative to the receiving object, for example by having a functional structure. In addition or as an alternative, the connector element and/or the sleeve may have incorporated the element to be anchored relative to the receiving object, for example in the form of a sensor or actuator. As an even further alternative, the connector may serve as rivet securing a further object 195 to the receiving object, as illustrated in FIG. 19. Therein, the sleeve has a flange 131 or head feature and the connector element 10 has a flange 191 or foot feature, whereby the receiving object (lightweight building element) and the further object 195 are clamped against each other at the end of the process, between the respective flange (head, foot) features.

Figure 20:
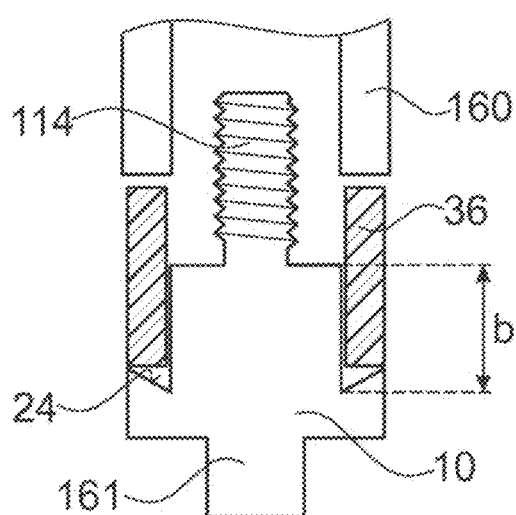
FIG. 20 is a schematic view in section of an even further connector assembly, together with a sonotrode.

FIG. 20 shows the principle that a connector interface of the connector element 10 does not necessarily have to be a female connector interface. Rather, in the embodiment of FIG. 20, the connector element is illustrated to have a male connector interface 114, namely a threaded bar extending proximally. Alternatively, a male connector interface may include a spherical head or any other suitable structure. In embodiments with a male connector interface 114, the optional condition that the sleeve 36 is longer than the connector element—or than the portion of the connector element proximally of a distance holding portion 161—a may be replaced by a condition that the sleeve is longer than an axial width b of a bonding zone. Such bonding zone extends between the proximally facing support face 24 and an axial position—illustrated by a dashed line in FIG. 20—that corresponds to the level of the receiving object first building layer when the connector is inserted. A sonotrode 160 for coupling the mechanical vibration into the sleeve 36 (partially illustrated in FIG. 20) in such embodiments is adapted such as to not come into contact with the male connector interface 114, for example by being hollow.

Figure 21:
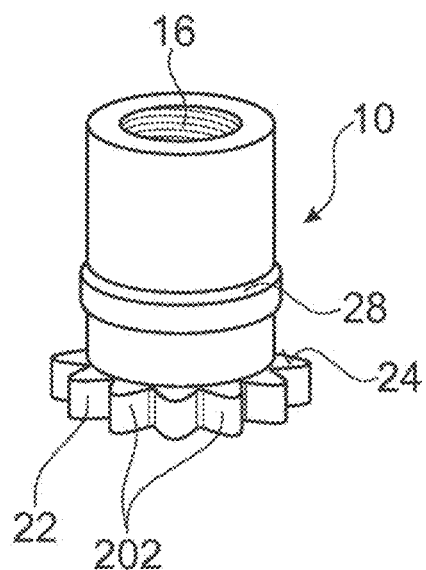
FIG. 21 is a schematic view of a connector element of yet another embodiment of a connector assembly.
Figure 22:
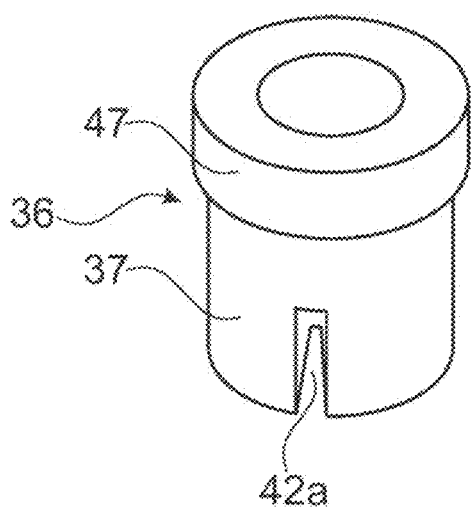
FIG. 22 is a schematic view of a sleeve of this embodiment.

In the embodiment of FIGS. 21 and 22, the connector element has a distal end collar that is distinct from the end collar 22 of the embodiment of for example FIGS. 1a-2b at least by having the following properties:

Firstly, the distal end collar 22 is not uninterrupted but includes an arrangement of tooth-like radial protrusions 202 that together form the collar. Thus, compared to an uninterrupted collar, the area of the liquefaction interface is reduced. Also, the tooth shape of the protrusions provides for an additional energy directing effect. As a result of both these effects, an overall resistance against the forward movement of the sleeve relative to the collar during the process is reduced so that compared to the previously described embodiments, the approach is useable for example for thermoplastic material that are harder and/or have a higher glass transition temperature. Further, thermoplastic material may—and will—be conveyed forwardly towards distally during the process in the spaces between the protrusions, and will flow past the distal end of the connector element to achieve additional anchoring.

Figure 23:
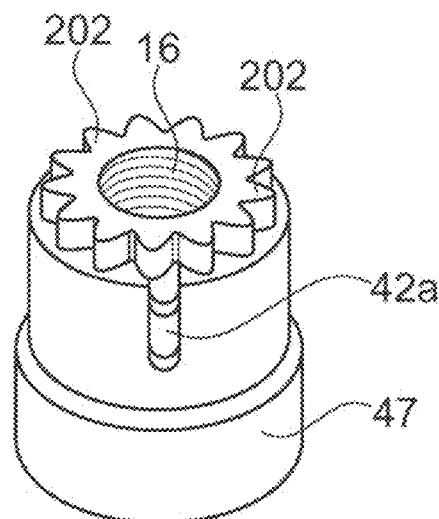
FIG. 23 is a schematic view, from a different direction, of the connector element of FIG. 21 and the sleeve of FIG. 22 in an assembled state.

Secondly, the distal end collar has a radial extension that is smaller than the radial extension of the sleeve at the liquefaction interface, see FIG. 23 showing the sleeve of FIG. 22 and the connector element of FIG. 21 in an assembled state and in upside-down orientation compared to FIGS. 21 and 22. Also this property (smaller radial extension of the distal end collar) has the effects of reducing the overall resistance by a reduced interface area and an energy directing effect, especially of radially-outer edges, and of allowing a material transport past the collar.

These first and second properties are independent of each other, i.e., they may be realized in combination, as illustrated, or individually.

Figure 24:
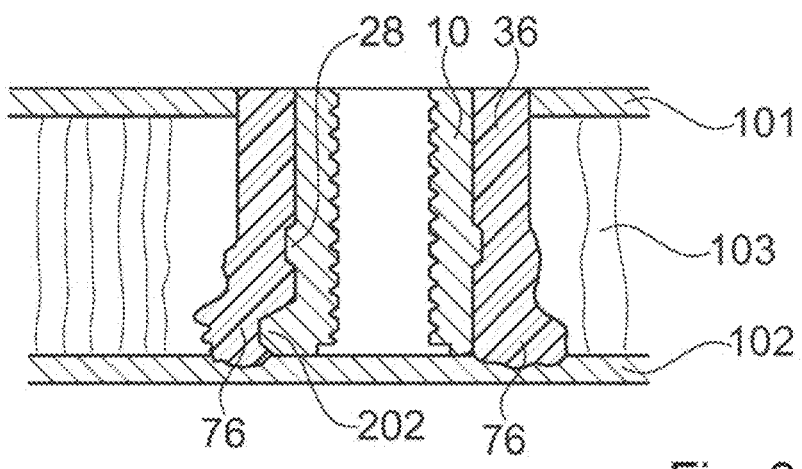
FIG. 24 is a schematic view in section of the connector assembly of FIG. 23 after the anchoring process.

FIG. 24 illustrates, in section, the assembly after the process, the section plane being chosen so that on the left-hand side it extends through one of the protrusions 202 whereas on the right-hand side it extends through a space between the protrusions. The flow portion 76 of the thermoplastic material includes a portion that has flown distally of the distal end of the connector and for example interpenetrates structures of the second building layer 102. Also a weld to thermoplastic material of the second building layer 102, if the second building layer 102 has thermoplastic material, for example a thermoplastic matrix material, is possible.

Generally, the features of the different embodiments may be combined. For example, different shapes of the support face may be combined with different distal (distance holding or other) structures, and both may be realized in configurations with one or more support faces of the connector.

A machine configured for carrying out the process described above may include a positioning device configured to place the connector element 10 and sleeve 36 in a mounting hole 64 of a receiving object 66. It may also include an energy transfer device, such as a heater or sonotrode, for transferring energy to the sleeve 36. The machine may also be equipped with a magazine including a plurality of sleeves 36 and connector elements 10, either as separate components or as connector assemblies 62, for automated, repeated anchoring operations on a feed of receiving objects moving through the machine.

The connector element 10 is made of a relatively non-thermoplastic material. An exemplary, suitable material for the connector element is metal, such as steel, aluminium, zinc alloy such as Zamak 5, or pot metal. However, the term relatively non-thermoplastic should be construed in the context of the anchoring process; in order to anchor a connector element 10 using the process, the body 20 of the connector element 10 needs to remain solid throughout the anchoring process. Hence, the term "relatively non-thermoplastic" should be construed to include also any thermoplastic materials having a melting point substantially higher than that of the sleeve 36, for example by at least 50° C., since such materials will not have thermoplastic properties in the context of the invention.

A thermoplastic material suitable for the sleeve 36 described hereinabove may include a polymeric phase (especially C, P, S or Si chain based) that transforms from solid into liquid or flowable above a critical temperature range, for example by melting, and retransforms into a solid material when again cooled below the critical temperature range, for example by crystallization, whereby the viscosity of the solid phase is several orders of magnitude, such as at least three orders of magnitude, higher than that of the liquid phase. The thermoplastic material may generally include a polymeric component that is not cross-linked covalently or that is cross-linked in a manner that the cross-linking bonds open reversibly upon heating to or above a melting temperature range. The polymer material may further include a filler, e.g., fibres or particles of a material that has no thermoplastic properties or has thermoplastic properties including a melting temperature range that is considerably higher than the melting temperature range of the basic polymer. Examples for the thermoplastic material are thermoplastic polymers, co-polymers or filled polymers, wherein the basic polymer or co-polymer is, e.g., polyethylene, polypropylene, polyamides (in particular polyamide 12, polyamide 11, polyamide 6, or polyamide 66), polyoxymethylene, polycarbonate-urethane, polycarbonates or polyester carbonates, acrylonitrile butadiene styrene (ABS), acrylonitrile-styrene-acrylate (ASA), styrene-acrylonitrile, polyvinyl chloride, polystyrene, or polyether ether ketone (PEEK), polyetherimide (PEI), polysulfone (PSU), poly(p-phenylene sulphide) (PPS), liquid crystal polymers (LCP), etc.

Mechanical vibration or oscillation suitable for the method according to the invention may typically have a frequency between 2 and 200 kHz; more typically between 10 and 100 kHz; and even more typically between 15 and 40 kHz. It may, by way of example, provide a typical vibration power of 0.2 to 20 W per square millimetre of active surface. The vibrating tool (e.g. sonotrode) may be designed such that its interface with the sleeve oscillates predominantly in the direction of the insertion axis and with an amplitude of between 1 and 100 μm, such as around 30 to 60 μm.

The invention has mainly been described above with reference to a few embodiments. However, as is readily appreciated by a person skilled in the art, other embodiments than the ones disclosed above are equally possible within the scope of the invention as defined by the appended patent claims. For example, the mounting hole 64 (FIG. 3) is illustrated as a blind hole. However, it may alternatively be configured as a through-hole, extending all the way through the lightweight building element. The inner face of the through-hole may be provided with an end-stop shoulder, for example by forming a smaller-diameter through-hole 64a through second building element 102. Thereby, the inner thread 14 (FIG. 1a) of the connector element 10 may be accessed from either side of the board. Moreover, the sleeve 36 (FIG. 2a) has been illustrated as having an axial through-hole 38 for receiving the connector element 10. However, this is not necessary—it may suffice that the sleeve is open at only one end. By way of example, the sleeve 36 may be closed by an axial end wall at the proximal end. Such a sleeve may be used for anchoring a hidden connector element that may be later accessed, by, e.g., removing the axial end wall to expose the thread, for installing optional components of, e.g., a re-configurable furniture system. In the foregoing, all components have been illustrated to have a substantially circular cylindrical or rotation-symmetric geometry about the insertion axis and centre axes C1, C2 (FIGS. 1a, 2a). However, even though such geometry may be preferred for circular mounting holes 64, and circular mounting holes may be easier to form by, e.g., drilling, a circular geometry is not necessary. Moreover, the connector element, the sleeve and the mounting hole do not need to have the same general shape, or mating shapes. In the foregoing, the first and second connector interfaces are described as screw interfaces. However, this is not necessary. The invention is also suitable for anchoring other types of connector interfaces, such as bayonet interfaces, click connections, magnets, clips, etc. The connector element to be anchored in the receiving object need not be provided with a female connector interface; alternatively, it may be a male connector interface, such as a threaded pin.

Embodiments that include transferring the energy as mechanical rotation energy will use connector elements and sleeves that compared to the connector elements/sleeves shown in the depicted embodiments include modifications. For example, the connector element of FIGS. 1a and 1b will not include the ridges 26 but an essentially rotationally symmetrical end collar 22. Similarly, the sleeve 36 of FIGS. 2a and 2b will not have the energy directing ridges 48 but a for example smooth or roughened outer surface. Further, both, the connector element and the sleeve will have torque transferring engagement structures. For example for the connector element, such engagement structures may be structures replacing the shown connector interface 14 or may be provided in addition thereto. For the sleeve, such engagement structures may for example be present as shape of a proximal portion of an inner surface around the axial through hole 38.

The invention claimed is:

1. A method of anchoring a connector element in a receiving object, the receiving object being a lightweight building element comprising a first building layer, a second building layer, and an interlining layer, wherein the interlining layer is arranged distally of the first building layer and the interlining layer is arranged between the first and second building layers, wherein the first building layer and the second building layer each are thinner and have a higher density than the interlining layer, and wherein the receiving object is provided with a mounting hole for receiving the connector element, the mounting hole penetrating the first building layer and extending into or through the interlining layer, and the connector element having a distal end and a proximal end, the method comprising the steps of:
    inserting the distal end of the connector element into the mounting hole in an insertion direction along an insertion axis;
    inserting a sleeve comprising a thermoplastic material into the mounting hole, the sleeve enclosing the connector element;
    causing a distally facing liquefaction face of the sleeve to be in contact with a proximally facing support face of the connector element;
    using a sonotrode engaging with a proximal end of the sleeve to transfer energy to liquefy at least a flow portion of the thermoplastic material of the sleeve and to press the liquefaction face against the support face so as to cause at least a fraction of the flow portion to flow radially outward; and
    causing the flow portion to re-solidify, whereby the re-solidified flow portion anchors the connector element in the receiving object;
    wherein prior to liquefying said at least a portion of the thermoplastic material, the distal end of the connector element is moved into an axial end position, in which it abuts an axial support face of the mounting hole,
    wherein the axial support face is an inner surface of the second building layer,
    wherein the proximal end of the sleeve is moved in the insertion direction while said flow portion of the sleeve is liquefied, and
    wherein the sleeve presses the connector element against the inner surface of the second building layer while said flow portion of the sleeve is liquefied.

2. The method according to claim 1, wherein the energy is transferred by means of mechanical energy transfer.

3. The method according to claim 2, wherein the energy is transferred by means of mechanical vibration.

4. The method according to claim 2, wherein the energy is transferred by means of mechanical rotation.

5. The method according to claim 1, wherein said liquefaction face is located at a distal end of the sleeve.

6. The method according to claim 1, wherein the energy is transferred to sequentially liquefy a plurality of axially separate portions of the thermoplastic material of the sleeve.

7. The method according to claim 1, wherein during the step of transferring the energy, a distal end of the connector element or an other distally facing abutment face of the connector element is held against an axial support face in the mounting hole.

8. The method according to claim 1, wherein during the step of transferring the energy and pressing, the sleeve is moved in the insertion direction while the connector element is essentially stationary.

9. The method according to claim 1, further comprising allowing at least a portion of the liquefied thermoplastic material to axially enclose a structure extending radially from a body of the connector element, and thereafter allowing the liquefied thermoplastic material to solidify to provide axial support between the connector element and the sleeve.

10. The method according to claim 1, further comprising allowing at least a portion of the liquefied thermoplastic material to penetrate into an indentation in a body of the connector element, and thereafter allowing the liquefied thermoplastic material to solidify to provide axial support between the connector element and the sleeve.

11. The method according to claim 1, wherein the connector element comprises a first connector interface for engaging with a mating second connector interface of an object to be connected to the receiving object.

12. The method according to claim 1, wherein causing at least a fraction of the flow portion to flow radially outward comprises causing a fraction of the flow portion into a space immediately distally of the first building layer and adjacent to it.

13. The method according to claim 1, wherein the proximally facing support face defines an undercut with respect to radial directions.

14. The method according to claim 1, wherein the connector element has a stepped shape, whereby it comprises a first proximally facing support face and a second proximally facing support face.

15. The method according to claim 1, wherein the connector element has a distance holding structure distally of the proximally facing support face, whereby the proximally facing support face is, during the step of transferring the energy, positioned at distance from an axial support defined by the receiving object.

16. The method according to claim 1,
wherein the proximally facing support face is a proximal face of a collar of the connector element,
wherein the sleeve has at least one distally protruding feature,
wherein the connector element is shaped for the distally protruding feature to be allowed to reach distally beyond a distal end of the collar when the sleeve encloses the connector element, and
wherein the method comprises the step of pressing, prior to pressing the liquefaction face against the support face, the distally protruding feature of the sleeve against a support structure of the receiving object until a portion of the thermoplastic material of the sleeve element liquefies and is pressed into structures of the receiving object.

17. The method according to claim 1, wherein the proximally facing support face is a proximal face of a collar.

18. The method according to claim 17, wherein the collar is constituted by a plurality of radial protrusions of the connector element.

19. The method according to claim 17, wherein a radial extension of the collar is smaller than a radial extension of a distal end of the sleeve.

\* \* \* \* \*